United States Patent
Emoto et al.

(10) Patent No.: US 12,448,323 B2
(45) Date of Patent: Oct. 21, 2025

(54) DENTAL GLASS COMPOSITION

(71) Applicant: Kuraray Noritake Dental Inc., Kurashiki (JP)

(72) Inventors: Tomohiro Emoto, Aichi (JP); Nobusuke Kashiki, Aichi (JP); Shinichiro Kato, Aichi (JP)

(73) Assignee: KURARAY NORITAKE DENTAL INC., Kurashiki (JP)

( * ) Notice: Subject to any disclaimer, the term of this patent is extended or adjusted under 35 U.S.C. 154(b) by 209 days.

(21) Appl. No.: 18/265,476

(22) PCT Filed: Dec. 6, 2021

(86) PCT No.: PCT/JP2021/044794
§ 371 (c)(1),
(2) Date: Jun. 6, 2023

(87) PCT Pub. No.: WO2022/124278
PCT Pub. Date: Jun. 16, 2022

(65) Prior Publication Data
US 2024/0043317 A1    Feb. 8, 2024

(30) Foreign Application Priority Data
Dec. 7, 2020    (JP) ................ 2020-202837

(51) Int. Cl.
| | | |
|---|---|---|
| C03C 8/16 | (2006.01) | |
| A61C 13/08 | (2006.01) | |
| A61K 6/20 | (2020.01) | |
| A61K 6/60 | (2020.01) | |
| A61K 6/77 | (2020.01) | |
| A61K 6/836 | (2020.01) | |
| A61K 6/884 | (2020.01) | |
| C03C 4/00 | (2006.01) | |

(52) U.S. Cl.
CPC ............. *C03C 8/16* (2013.01); *A61C 13/082* (2013.01); *A61K 6/20* (2020.01); *A61K 6/60* (2020.01); *A61K 6/77* (2020.01); *A61K 6/836* (2020.01); *A61K 6/884* (2020.01); *C03C 4/0021* (2013.01)

(58) Field of Classification Search
CPC ...... A61C 13/082; A61K 6/884; A61K 6/836; A61K 6/60; A61K 6/20; A61K 6/77; C03C 8/16; C03C 4/0021; C03C 2209/00
See application file for complete search history.

(56) References Cited

U.S. PATENT DOCUMENTS

| | | | |
|---|---|---|---|
| 6,444,597 B1 * | 9/2002 | Sato ................. | A61K 6/69 106/35 |
| 2002/0088372 A1 * | 7/2002 | Abiru ................ | A61K 6/54 106/35 |
| 2009/0227438 A1 | 9/2009 | Fukatani et al. | |
| 2022/0211586 A1 | 7/2022 | Yokota et al. | |

FOREIGN PATENT DOCUMENTS

| | | | |
|---|---|---|---|
| CN | 109481374 | * | 3/2019 |
| EP | 3708139 A1 | | 9/2020 |
| JP | 2002220314 A | | 8/2002 |
| JP | 2003-183111 | * | 7/2003 |
| JP | 20031833111 A | | 7/2003 |
| JP | 2009207743 A | | 9/2009 |
| KR | 2011-0059971 | * | 6/2011 |
| WO | WO-2020230192 A1 | | 11/2020 |

OTHER PUBLICATIONS

Extended European Search Report issued Feb. 5, 2025, received on Feb. 22, 2025, in corresponding European Patent Application No. 21903378.4, 8 pages.
International Search Report issued Jan. 25, 2022 in PCT/JP2021/044794 (with English translation), 4 pages.
Written Opinion issued Jan. 25, 2022 in PCT/JP2021/044794 (with English translation), 8 pages.

* cited by examiner

*Primary Examiner* — C Melissa Koslow
(74) *Attorney, Agent, or Firm* — Element IP, PLC

(57) ABSTRACT

The present invention provides a dental glass composition that has excellent fixability to dental prostheses, and that does not need firing and fixing to layer color or enable a build-up of porcelain thereon. The present invention relates to a dental glass composition comprising a glass powder (A) and a wax component (B). The glass powder (A) has an average particle diameter of preferably 0.05 μm to 50 μm. The wax component (B) has a boiling point of preferably 400° C. or less.

12 Claims, No Drawings

DENTAL GLASS COMPOSITION

TECHNICAL FIELD

The present invention relates to a dental glass composition used for staining and shade adjustments of dental prostheses, and to a method of production of dental prostheses using same. More specifically, the invention relates to a dental glass composition suitably used for ceramic material items, for example, such as crowns, inlays, bridges, the upper structure of an implant, and denture artificial teeth, particularly a dental glass composition suited as a shade adjusting composition for ceramic crown porcelain (hereinafter, also referred to as "porcelain stain"), and a method of production of dental prostheses using same.

BACKGROUND ART

Ceramic dental prostheses such as metal-ceramic dental prostheses and all-ceramic dental prostheses are available as dental prostheses (for example, such as veneer crowns, crowns, and post crowns) that restore aesthetics close to natural teeth, and these use dental porcelain to express the shade of the dentin color or enamel with a variety of materials such as metal, zirconium oxide (zirconia), aluminum oxide (alumina), feldspar glass, and disilicate glass.

In a production method of ceramic dental prostheses, a technique is available that, in order to mimic the shades of individual natural teeth, expresses the color and texture of natural teeth in a dental prosthesis, for example, such as staining of the cementum, dentin, cervical region, and adjacent surfaces of natural teeth, and hairlines and enamel cracks. In such a technique, for example, a porcelain stain is used for the dental prosthesis to help the ceramic dental prosthesis better blend in with the shade of natural teeth surrounding the tooth that has had the dental prosthesis applied to it.

When using porcelain stains, a porcelain stain is collected onto a mixing glass plate or a stain pallet after selecting the appropriate shade. Porcelain stains are typically supplied in powder or paste form. In the case of a powder porcelain stain, the powder needs to be prepared into a paste form by collecting an appropriate amount of powder onto a mixing glass plate or a stain pallet, and kneading the powder to provide desired paste properties, for example, by adjusting the powder-to-liquid ratio with addition of water or a designated liquid to make the powder spreadable. A paste porcelain stain undergoes a change in paste properties over time, for example, a viscosity increase, during preservation or after the paste is collected onto a mixing glass plate or a stain pallet in the appropriate amount. This poses a spreadability issue by making the paste not easily spreadable, or causing bleeding during application. There accordingly is a need for a porcelain stain that is easy to handle, and exhibits excellent spreadability.

Internal staining and surface staining are common techniques used to stain ceramic dental prostheses to mimic natural teeth. In internal staining, a porcelain stain is used between enamel porcelain and dentin porcelain, whereas, in surface staining, a porcelain stain is used for the outermost surface of enamel porcelain.

In these techniques, the porcelain stain, after application to a dental prosthesis, needs to be fired in the firing schedule optimized for each type of porcelain stain, using a dental laboratory porcelain furnace (hereinafter, also referred to as "firing and fixing"), in order for the inorganic pigment component contained in the porcelain stain to fuse into the dental prosthesis, and, in the case of internal staining, to prevent the porcelain stain from affecting subsequent layering of another porcelain. Because such production of a dental prosthesis requires multiple firing, a porcelain stain is needed that enables a shorter production process.

An example of a shade adjusting composition for ceramic crown porcelain is the powder- or paste-like porcelain stain containing a specific aluminosilicate glass disclosed in Patent Literature 1.

CITATION LIST

Patent Literature

Patent Literature 1: JP 2009-207743 A

SUMMARY OF INVENTION

Technical Problem

In Patent Literature 1, however, the porcelain stain needs to be applied in paste form, and a paste needs to be prepared by mixing the powder with liquid before every use. Additionally, the paste was found to be not easily adjustable because the paste does not easily spread when the viscosity is too high, whereas bleeding occurs during application when the paste viscosity is too low. Another issue is that, even with the paste-like porcelain stain of Patent Literature 1, the paste is not easily applicable because of a change in paste properties occurring as a result of a viscosity increase over time.

Another drawback is that, in Patent Literature 1, the stain needs to be fired for each layer when the stain is layered, irrespective of internal staining or surface staining. Internal staining also requires a large number of steps because the porcelain stain needs to be fired and fixed before building up the porcelain on the surface layer. Various problems were found to occur when firing and fixing is not performed, including, for example, unintentional mixing of the porcelain stain into the porcelain in a subsequent build-up, and the shade of the porcelain stain running off before or during the firing of the layered porcelain because of the porcelain stain not being fixed.

It is accordingly an object of the present invention to provide a dental glass composition that has excellent fixability to dental prostheses, and that does not need firing and fixing to layer color or enable a build-up of porcelain thereon.

Solution to Problem

The present inventors conducted intensive studies to find a solution to the foregoing issues, and found that a dental glass composition comprising a glass component and a wax component can be directly applied to a dental prosthesis without being prepared into a paste, and can provide a dental prosthesis of desired shade without firing and fixing, a process necessary in internal staining. The invention was completed after further studies.

Specifically, the present invention includes the following.
[1] A dental glass composition comprising a glass powder (A) and a wax component (B).
[2] The dental glass composition according to [1], wherein the glass powder (A) has an average particle diameter of 0.05 μm to 50 μm.

[3] The dental glass composition according to [1] or [2], wherein the wax component (B) has a boiling point of 400° C. or less.
[4] The dental glass composition according to any one of [1] to [3], wherein the wax component (B) has a melting point of 35 to 120° C.
[5] The dental glass composition according to [4], wherein the wax component (B) comprises a high-melting-point wax (B-1) having a melting point of 75° C. or more and 120° C. or less.
[6] The dental glass composition according to any one of [1] to [5], wherein the content of the wax component (B) is 3 to 65 mass %.
[7] The dental glass composition according to any one of [1] to [6], which further comprises an oil component (C).
[8] The dental glass composition according to [7], wherein the oil component (C) has a boiling point of 100 to 400° C.
[9] The dental glass composition according to [7] or [8], wherein the content of the oil component (C) is 0.3 to 30 mass %.
[10] The dental glass composition according to any one of [1] to [9], which is a porcelain stain.
[11] A method for producing a dental prosthesis, comprising the step of applying a dental glass composition of any one of [1] to [10] to a dental prosthesis base material having a ceramic surface, and the step of firing dental porcelain after build-up without firing the base material to which the dental glass composition has been applied.
[12] The method for producing a dental prosthesis according to [11], wherein the firing step after a build-up of the dental porcelain has a firing temperature of 700 to 1,100° C.

Advantageous Effects of Invention

According to the present invention, a dental glass composition can be provided that has excellent fixability to dental prostheses, and that does not need firing and fixing to layer color or enable a build-up of porcelain thereon. A dental glass composition of the present invention undergoes a reduced change with time in the dental glass composition itself, and, while being easy to handle and applicable to a dental prosthesis in thin films, can be applied without bleeding because it has no flowability. A dental glass composition of the present invention can be used by itself for dental prostheses, or can be used with a sponge, such as a brush or an eye color tip applicator, to provide a gradation from the cervical to the incisal region, or can be blurred with a finger. By being easy to handle, a dental glass composition of the present invention enables easy fabrication of a dental prosthesis of desired shade. Additionally, it is possible to produce a dental prosthesis using a shorter production process because a subsequent build-up of porcelain is possible without firing and fixing.

DESCRIPTION OF EMBODIMENTS

A feature of a dental glass composition of the present invention is that it comprises a glass powder (A) and a wax component (B).
<Glass Powder (A)>
The glass powder (A) contained in a glass composition of the present invention is described first. The glass powder (A) used in the present invention is not particularly limited, as long as the present invention can exhibit its effects. A whole range of dental glass powders can be used, provided that the glass powder can be baked into the base material (e.g., a core or a frame as a material of a dental prosthesis). Examples of the glass powder (A) include amorphous-type potassium aluminosilicate glass ($4SiO_2 \cdot Al_2O_3 \cdot K_2O$), leucite crystal-type potassium aluminosilicate glass, fluoroapatite glass, and lithium silicate glass. Examples of the constituent components of the glass powder (A) include $SiO_2$, $Al_2O_3$, $B_2O_3$, $Li_2O$, $Na_2O$, $K_2O$, $CaO$, $MgO$, and $Sb_2O_3$. More than one component is selected in appropriate proportions according to the base material used. It is also possible to add components such as $TiO_2$, $SrO$, $BaO$, $ZnO$, $CeO_2$, $ZrO_2$, and $P_2O_5$ in appropriate proportions. The glass powder (A) may be used alone, or two or more thereof may be used in combination.

The base material is not particularly limited, as long as it can be used for dental purposes. Examples include various ceramics (dental ceramics such as zirconium oxide (zirconia), aluminum oxide (alumina), feldspar glass, and lithium disilicate); and ceramics, such as metal-ceramic dental prostheses and all-ceramic dental prostheses, in which dental porcelain used to express the shade of the dentin color or enamel is baked into a dental metal core or a ceramic core such as above in a single or multiple layers.

Preferably, the glass powder (A) used in the present invention has a coefficient of linear thermal expansion close to the coefficient of linear thermal expansion of the base material used. For example, the glass powder (A) may have a coefficient of linear thermal expansion of $6.0 \times 10^{-6}$ $K^{-1}$ to $14.0 \times 10^{-6}$ $K^{-1}$ in the 25° C. to 500° C. range. The coefficient of linear thermal expansion can be measured using a known method and a known device. For example, the coefficient of linear thermal expansion can be measured by heating a specimen from room temperature to 500° C. with a thermomechanical analyzer TMA8311 (manufactured by Rigaku Corporation; rate of temperature increase 5° C./min).

A wide range of commonly used ceramic raw materials can be used as raw material substances of the glass powder (A) used in the present invention. The raw material substance of glass powder (A) is not particularly limited, as long as it is the component of glass powder (A) itself, and/or a substance that can turn into such components by being heated in the atmosphere. The type of raw material to prepare is decided, and these are mixed after determining the composition of glass by calculation. The method of mixing raw material substances is not particularly limited. The preferred method is to uniformly disperse the raw material substances.

The mixed raw material substances are melted at 1,200° C. or higher temperatures to generate glass. The method used for melting is not particularly limited, as long as all the mixed raw material substances dissolve and uniformly become amorphous, without undergoing changes such as sublimation of components.

The method used to cool the melt is not particularly limited either, and the melt may be cooled by a method such as rapid cooling in water. The clump of glass obtained in this fashion is dried and pulverized to obtain glass powder (A). The method used for the pulverization of a glass clump, and the method used to classify the pulverized particles into desired particle sizes are not particularly limited.

The glass powder (A) used in the present invention may comprise a colorant. The colorant may be amorphous or crystalline. The glass powder (A) may comprise a crystalline powder. Examples of the colorant include a pigment, a composite pigment, and a fluorescent agent. The colorant may be used alone, or two or more thereof may be used in combination.

Examples of the pigment include an oxide of at least one element selected from the group consisting of Ti, V, Cr, Mn, Fe, Co, Ni, Zn, Y, Zr, Sn, Sb, Bi, Ce, Pr, Sm, Eu, Gd, Tb, and Er. Preferably, the glass powder (A) comprises an oxide of at least one element selected from the group consisting of Ti, V, Cr, Mn, Fe, Co, Ni, Pr, Tb, and Er. Examples of the oxide include praseodymium oxide, vanadium oxide, iron oxide, nickel oxide, chromium oxide, manganese oxide, cerium oxide, tin oxide, zirconium oxide, zinc oxide, and titanium oxide. Examples of the composite pigment include $(Zr,V)O_2$, $Fe(Fe,Cr)_2O_4$, $(Ni,Co,Fe)(Fe,Cr)_2O_4 \cdot ZrSiO_4$, and $(Co,Zn)Al_2O_4$. Preferably, the glass powder (A) comprises $(Zr,V)O_2$. Examples of the fluorescent agent include $Y_2SiO_5$:Ce, $Y_2SiO_5$:Tb, $(Y,Gd,Eu)BO_3$, $Y_2O_3$:Eu, YAG:Ce, $ZnGa_2O_4$:Zn, and $BaMgAl_{10}O_{17}$:Eu. In a method of producing a dental glass composition comprising a color component, the color component may be simply mixed with the glass powder (A), or may be mixed with the glass powder (A), and fused by heat at 600 to 1,200° C., followed by pulverization.

In order to achieve shades close to natural teeth, there is a need to balance the finest possible grain size with a moderately coarser grain size needed to produce color. Taking this into consideration, the glass powder (A) used in the present invention has an average particle diameter of preferably 0.05 to 50 μm, more preferably 0.08 to 35 μm, even more preferably 0.1 to 20 μm, particularly preferably 0.1 to 10 μm, most preferably to 5 μm. An average particle diameter of 50 μm or less provides excellent aesthetics because it allows the dental glass composition to adequately adhere to the frame, and makes the color grains visually unnoticeable while preventing porcelain from falling during a build-up. An average particle diameter of 0.05 μm or more provides sufficient color production by preventing burning due to firing.

In a dental glass composition of the present invention, the content of glass powder (A) is preferably such that the glass powder (A) can be kneaded with the wax component (B). The preferred content of glass powder (A) is 35 mass % or more. In view of more superior color production and greater fixability to dental prostheses, the content of glass powder (A) is more preferably 45 mass % or more, even more preferably 55 mass % or more, particularly preferably 68 mass % or more. The content of glass powder (A) is not particularly limited, and is preferably 97 mass % or less, more preferably 95 mass % or less, even more preferably 93 mass % or less, particularly preferably 91 mass % or less. When a dental glass composition of the present invention comprises an oil component (C), the content of glass powder (A) is preferably 34 mass % or more, though it is not particularly limited. In view of more superior color production and greater fixability to dental prostheses, the content of glass powder (A) is more preferably 44 mass % or more, even more preferably 54 mass % or more, particularly preferably 67 mass % or more. When a dental glass composition of the present invention comprises an oil component (C), the content of glass powder (A) is preferably 96 mass % or less, more preferably 94 mass % or less, even more preferably 92 mass % or less, particularly preferably 90 mass % or less, though it is not particularly limited.

<Wax Component (B)>

The following describes the wax component (B) contained in a dental glass composition of the present invention. The wax component (B) is contained to disperse the glass powder, and solidifies the dental glass composition at ordinary temperature. The wax component (B) may be used alone, or two or more thereof may be used in combination.

Preferably, the wax component (B) used in the present invention is solid at ordinary temperature (20 to 35° C.), and includes those that melt by being heated. A certain preferred embodiment may be, for example, a dental glass composition that comprises a glass powder (A) and a wax component (B), and in which the wax component (B) is solid at ordinary temperature, and consists solely of those that melt by being heated. It is advantageous over the related art to use a wax component (B) that is solid at ordinary temperature, and that melts by being heated because there will be no changes in properties over time, such as a viscosity increase in the glass composition, and it is not required to perform or repeat firing and fixing. A dental glass composition of the present invention, therefore, allows a color to be layered with ease, and porcelain (for example, a dental porcelain for surface staining) to be built up thereon. It is also possible to apply a dental glass composition of the present invention in thin films. The wax component (B) may be a known wax. For example, any of a natural wax, a synthetic wax, and a processed (or modified) wax can be used.

Specific examples of wax component (B) include:

waxes of animal origin, such as beeswax, spermaceti wax, beef tallow, hardened beef tallow, and lard;

waxes of plant origin, such as carnauba wax, wood wax, hardened palm oil, hardened castor oil, and candelilla wax;

petroleum waxes, such as paraffin wax, microcrystalline wax, and white petrolatum;

mineral waxes such as montan wax; and synthetic waxes, such as polyolefin wax (specifically, polyolefin wax containing an α-olefin such as ethylene or propylene as a monomer unit), and polyethylene glycol (a molecular weight of 1,000 or more).

Other examples of wax component (B) include long-chain fatty acids (such as stearic acid, behenic acid), long-chain fatty acid esters, long-chain fatty acid amides (such as stearamide), and ketone waxes (e.g., a long-chain aliphatic ketone such as diheptadecyl ketone), which are solid at ordinary temperature.

In view of providing preservation stability to maintain a stable solid state at room temperature, and providing desirable fixability to dental prostheses, the wax component (B) used in the present invention has a melting point of preferably 35 to 120° C., more preferably 40 to 110° C., even more preferably 50 to 100° C. When the melting point is 35° C. or less, it is not possible to maintain the solid state, and the dental glass composition may run off from the drawn surface while being layered or during a build-up of surface porcelain. With a melting point of higher than 120° C., it may not be possible to provide stickiness to the dental prosthesis, and inadequate staining may result.

In a dental glass composition of the present invention, the content of wax component (B) is preferably 3 to 65 mass %, more preferably 5 to 55 mass %, even more preferably 7 to 45 mass %, particularly preferably 9 to 32 mass %. With the content of wax component falling within these ranges, it is easier to obtain a solid dental glass composition that excels in chromogenicity and stainability, and that exhibits desirable stickiness and fixability to dental prostheses while having high formability and high strength. When the content of wax component (B) is less than 3 mass %, it is not possible to maintain the solid state, and the dental glass composition may run off from the drawn surface while the dental glass composition is layered or during a built up of surface porcelain. When the content of wax component (B) is more than 65 mass %, the dental glass composition may fail to fix and produce color.

The smoothness improves when a dental glass composition of the present invention comprises an oil component (C) (described later); however, the dental glass composition becomes more easily removed from the dental prosthesis it is adhering to when subjected to, for example, abrasion. In view of increasing the fixability of the dental glass composition, it is preferable to comprise an oil component (C) with a high-melting-point wax (B-1) (hereinafter, also referred to as "first wax (B-1)").

Here, the first wax (B-1) is a wax component (B) having a melting point of 75° C. or more and 120° C. or less in the examples of wax component (B) given above. With a melting point of 75° C. or more, conformability to fine surface irregularities of the base material can be obtained when the first wax (B-1) is combined with the oil component (C), and the dental glass composition can have increased fixability. Examples of the first wax (B-1) include carnauba wax, hardened castor oil (melting point: about 80 to a polyolefin wax (with a melting point of 75° C. or more, for example, such as a low-molecular polyethylene wax (melting point: about 100 to 120° C.)), a long-chain fatty acid (such as behenic acid), a fatty acid amide (such as stearamide (melting point: about 98 to 105° C.)), and a microcrystalline wax (with a melting point of about 75 to 98° C.). Preferred are behenic acid and carnauba wax because these have high melting points, and enable solidification in small amounts, in addition to leaving no residues after firing.

The content of the first wax (B-1) in the wax component (B) is preferably 3 to 100 mass %, more preferably 5 to 80 mass %, even more preferably 7 to 70 mass %, particularly preferably 10 to 60 mass %. With the content of first wax (B-1) falling within these ranges, the dental glass composition can more easily achieve a balance between drawing smoothness and fixability. In view of providing a dental glass composition achieving even smoother drawing and more superior fixability, the content of the first wax (B-1) in a dental glass composition comprising the first wax (B-1) is preferably less than 15 mass %, more preferably less than 12 mass %, even more preferably less than 10 mass % in the whole dental glass composition.

The wax component used in the present invention may be a combination of the first wax (B-1) and a wax component having a melting point of less than 75° C. (for example, a wax other than the first wax (B-1) in the examples of wax components given above; hereinafter, also referred to as "second wax (B-2)"). By comprising the second wax (B-2), the dental glass composition can have greater slidability during drawing. A dental glass composition having greater drawing slidability can be obtained by comprising the second wax (B-2), particularly when the dental glass composition does not comprise an oil component (C).

The second wax (B-2) has a melting point of preferably 50° C. or more and less than 75° C., more preferably 55 to 73° C., even more preferably 60 to 70° C. Preferred examples of the second wax (B-2) include white petrolatum (melting point: about 38 to stearic acid (melting point: about 69 to 70° C.), candelilla wax (melting point: about 68 to 72° C.), beeswax (melting point: about 63° C.), hardened palm oil (melting point: about 59° C.), microcrystalline wax (with a melting point of about 67 to 70° C.), paraffin wax (with a melting point of about 47 to 69° C.), hardened beef tallow (melting point: about 46° C.), ketone wax (with a melting point of less than about 60 to 75° C.), and polyethylene glycol (with a molecular weight of 1,000 or more, and a melting point of or more and less than 75° C.).

In order to meet the need for the wax component (B) to burn off in a more sufficient fashion to such an extent that it does not affect the shade after firing when the dental glass composition is coated on the base material, and dental porcelain is fired after being built up on the dental glass composition, the wax component (B) of the present invention has a boiling point of preferably 400° C. or less, more preferably 385° C. or less, even more preferably 370° C. or less.

Preferably, a dental glass composition of the present invention further comprises an oil component (C). By comprising an oil component (C), the dental glass composition can have increased smoothness, and improved ease of handling. The oil component (C) may be used alone, or two or more thereof may be used in combination.

<Oil Component (C)>

The oil component (C) may be, for example, one that is liquid at ordinary temperature (20 to 35° C.). Examples of the oil component (C) include oils of animal and plant origin, such as olive oil; mineral oils such as liquid paraffin; synthetic oils such as silicone oil; long-chain fatty acids that are liquid at ordinary temperature (e.g., long-chain fatty acids having a melting point of less than 35° C., such as oleic acid and linolenic acid); and long-chain alcohols derived from long-chain fatty acids and that are liquid at ordinary temperature (e.g., long-chain alcohols having a melting point of less than 35° C., such as oleyl alcohol). The oil component (C) may be used alone, or two or more thereof may be used in combination.

It is easier to increase dispersibility when the oil component (C) is one that is compatible (miscible) with the wax component (B) when the wax component (B) is in a molten state, or one that dissolves in the wax component (B). By containing the oil component (C), the viscosity of the wax component (B) can be adjusted in a molten state, and the dispersibility of the glass component (A) can increase. It is also possible to enable uniform staining with good ease of handling, and provide more superior slidability during drawing. Additionally, the dental glass composition can have even greater fixability by increasing the dispersibility of glass powder (A) and wax component (B). Preferred as oil component (C) are mineral oils such as liquid paraffin (e.g., petroleum-derived oils), and long-chain alcohols derived from long-chain fatty acids and that are liquid at ordinary temperature, such as oleyl alcohol.

In order to meet the need for the oil component (C) to burn off in a more sufficient fashion to such an extent that it does not affect the shade after firing when the dental glass composition is coated on the base material, and dental porcelain is fired after being built up on the dental glass composition, the oil component (C) of the present invention has a boiling point of preferably 400° C. or less, more preferably 385° C. or less, even more preferably 370° C. or less. The boiling point is preferably 100° C. or more because it may be difficult with an oil component (C) having a boiling point of less than 100° C. to stably maintain the solid state due to the progression of vaporization and drying even at room temperature. The boiling point of oil component (C) is preferably 100 to 400° C., more preferably 100 to 385° C., even more preferably 100 to 370° C.

When a dental glass composition of the present invention contains an oil component (C), the content of the oil component (C) is preferably 0.3 to 30 mass %, more preferably 0.5 to 25 mass %, even more preferably 0.6 to 15 mass %. With the content of oil component (C) falling within these ranges, it is easier to impart moderate strength and heat resistance to the dental prosthesis obtained, and to increase the drawing slidability and the fixability of the dental glass composition. When the content of oil component (C) is less than 0.3 mass %, the dental glass composition may fail to fix and produce color. The dental glass composition may fail to fix and produce color also when the content of oil component (C) is more than 30 mass %. When a dental glass composition of the present invention contains an oil component (C), it is preferable that the content of the oil component (C) be lower than the content of the wax component (B).

In view of providing a solid dental glass composition, and imparting superior fixability to dental prostheses while providing excellent chromogenicity, it is preferable in a dental glass composition of the present invention that the content of the component that has liquid properties at ordinary temperature (for example, oil component (C), an organic solvent) be less than 18 mass %, more preferably less than 15 mass %, even more preferably less than 12 mass %.

A dental glass composition of the present invention may optionally comprise a known additive used for dental glass compositions. Examples of such additives include resins (for example, an ethylene-vinyl acetate copolymer), binders, antioxidants, surfactants, preservatives, anti-fungal agents, and antimicrobial agents. The additives may be used alone, or two or more thereof may be used in combination.

A dental glass composition of the present invention may optionally comprise an adhesive resin (for example, known adhesive resins such as rosin, and/or petroleum resins such as modified rosins). Examples of the modified rosins include esters such as rosin ester, hydrogenated rosin ester, and/or polymeric rosin ester. The adhesive resin may be used alone, or two or more thereof may be used in combination.

A dental glass composition of the present invention may be produced with the glass powder (A) and the wax component (B) using a known method. The method of production is not particularly limited, and the dental glass composition can be obtained by, for example, adding and mixing a glass powder into a molten liquid wax component (B), pouring the mixture into a mold and cooling the mixture to solidify, and taking the solid out of the mold.

In an embodiment of the present invention, a dental glass composition of the present invention can also be obtained by extrusion molding of such a mixture. The components can be mixed while the wax component (B) is in a liquid state. Typically, the components are mixed after being heated to a temperature equal to or greater than the melting point of the wax component (B). When the oil component (C) is contained, the oil component (C) may be mixed with the wax component (B) after melting the wax component (B) at a temperature equal to or greater than the melting point of the wax component (B), and the components may be mixed while the mixture is in a liquid state.

The sequence of mixing the components is not particularly limited. It is, however, preferable to add and disperse the glass powder (A) in a liquid wax component (B). When the oil component (C) is contained, the oil component (C) may be mixed after dispersing the glass powder (A) in the wax component (B). It is, however, preferable to add the glass powder (A) after mixing the wax component (B) and oil component (C) beforehand. Alternatively, the glass powder (A) may be added and mixed into a mixture prepared in advance by mixing a portion of wax component (B) and a portion of oil component (C), and this may be followed by addition of the remaining portions of wax component (B) and oil component (C). A mixture containing the constituent components can be made into a solid dental glass composition by being cooled to a temperature below the melting point of the wax component (B) in a mold.

A dental glass composition of the present invention may comprise a solvent, as long as the present invention can exhibit its effects. Examples of the solvent include water, and organic solvents. In order to meet the need for the solvent to burn off in a sufficient fashion to such an extent that it does not affect the shade after firing when the dental glass composition is coated on the base material, and dental porcelain is fired after being built up on the dental glass composition, the organic solvent has a boiling point of preferably 400° C. or less, more preferably 385° C. or less, even more preferably 370° C. or less. The boiling point is preferably 100° C. or more because it may be difficult with an organic solvent having a boiling point of less than 100° C. to stably maintain the solid state due to the progression of vaporization and drying even at room temperature. The boiling point of organic solvent is preferably 100 to 400° C., more preferably 100 to 385° C., even more preferably 100 to 370° C. Examples of the organic solvent include alcohols such as 1-butanol, 2-butanol, 1-heptanol, 2-heptanol, 3-heptanol, 1-hexanol, 2-hexanol, 3-hexanol propylene glycol monopropyl ether, dipropylene glycol monoethyl ether, tripropylene glycol monomethyl ether, diethylene glycol monobutyl ether, triethylene glycol monomethyl ether, polyethylene glycol monomethyl ether, ethylene glycol monobenzyl ether, ethylene glycol monophenyl ether, diethylene glycol monobenzyl ether, benzyl alcohol, 3-(benzyloxy)-1-propanol, 2-(benzyloxy)-1-butanol, and 5-(benzyloxy)-1-pentanol; and amine compounds such as diethanolamine and triethanolamine. A certain embodiment may be, for example, a dental glass composition that comprises a glass powder (A) and a wax component (B), and that is essentially free of a solvent. Regarding essentially free of a solvent, the solvent content in the dental glass composition may be less than 0.1 mass %, or less than 0.01 mass %. Another embodiment may be, for example, a dental glass composition comprising a glass powder (A), a wax component (B), and an amine compound. When the wax component (B) in the dental glass composition contains, for example, a long-chain fatty acid (such as stearic acid or behenic acid), the amine compound forms a salt with the long-chain fatty acid, and exhibits a surfactant action. This appears to provide improved smoothness in the dental glass composition during drawing, and improved fixability in the dental glass composition. In this case, the content of the component having liquid properties at ordinary temperature (for example, oil component (C), organic solvent) is preferably less than 18 mass %, more preferably less than 15 mass %, even more preferably less than 12 mass %.

Aside from the glass powder (A), wax component (B), and oil component (C), a dental glass composition of the present invention may additionally comprise other components (optional components), provided that such additional components do not hinder the effects of the present invention. Examples of such additional components include a colorant, a pH adjuster, a polymerization accelerator, and a polymerization initiator. The additional components may be used alone, or two or more thereof may be used in combination. The colorant may be, for example, a colorant that decolors during firing. Examples of the colorant that decolors during firing include food dyes that dissolve in organic solvent. Examples of the food dyes include:

organic dyes containing two or more aromatic groups, such as yellow 4 (tartrazine), yellow 5 (sunset yellow FCF), red 2 (amaranth), red 102 (new coccin), blue 1 (brilliant blue FCF), blue 2 (indigo carmine), green 3 (fast green FCF), and red 102 (new coccin);

organic dyes containing fused aromatic groups with a xanthene scaffold (xanthene dye), such as acid red 289, bromopyrogallol red, rhodamine B, rhodamine 6G, rhodamine 6GP, rhodamine 3GO, rhodamine 123, eosin, eosin B, eosin Y, fluorescein, and fluorescein isothiocyanate;

cochineal dyes (carmic acid dyes); and betalain dyes such as beet red (main components: isobetanin and betanin), betanin, isobetanin, probetanin, and neobetanin.

A certain embodiment may be, for example, a dental glass composition that comprises a glass powder (A) and a wax component (B), and, optionally, an oil component (C), and that is essentially free of a colorant that decolors during firing. Regarding essentially free of a colorant that decolors during firing, the content of the colorant that decolors during firing may be, for example, 1,000 ppm or less by mass, preferably 100 ppm or less by mass, more preferably 10 ppm or less by mass, even more preferably 1 ppm or less by mass, particularly preferably 0.1 ppm or less by mass, most preferably 0 ppm by mass relative to the mass of the dental glass composition. The content of the additional components is not particularly limited, and is preferably mass % or less, more preferably 12.0 mass % or less.

The following describes a method of production of a dental prosthesis using a glass composition of the present invention. The production method of a dental prosthesis may be appropriately selected according to the oral environment.

A dental prosthesis production method of the present invention may be, for example, a production method for the fabrication of a dental prosthesis, comprising the step of applying the dental glass composition to a dental prosthesis base material having a ceramic surface, and the step of firing dental porcelain after build-up without firing the base material to which the dental glass composition has been applied (firing step). The base material is as described above. A dental prosthesis base material having a ceramic surface means a base material (e.g., a core or a frame) before build-up of dental porcelain. A dental prosthesis base material having a ceramic surface can be produced by working a commercially available product (for example, KATANA zirconia STML, manufactured by Kuraray Noritake Dental Inc.) using a known method. The method of applying the dental glass composition to a dental prosthesis base material having a ceramic surface is not particularly limited, and known methods can be used. Examples of a final dental prosthesis obtained by using a glass composition of the present invention include metal-ceramic dental prostheses, and all-ceramic dental prostheses restored with, for example, an alumina core or a zirconia core. Specific examples of the dental prosthesis include inlays, full veneer crowns, fabricated dentures (bridges), and the upper structure of an implant in a prosthesis with a gingival (gum) portion.

A dental glass composition of the present invention can produce color by being fired after being directly applied as an internal- or surface-staining porcelain stain to a dental prosthesis base material having a ceramic surface. When the dental prosthesis base material having a ceramic surface is a more recent zirconia material having high transparency, a glass composition of the present invention can produce color by being fired after being directly applied to zirconia as an internal-staining porcelain stain, for example, by assuming that the zirconia frame itself is the dentin color. Here, "directly apply" means applying as it is, without being formed into a paste form by adding a designated liquid (a liquid material containing water, ethanol, or the like). In another aspect of the present invention, a dental glass composition comprising a glass powder (A) and a wax component (B) is provided for use as a porcelain stain of the direct application type. A dental glass composition of the present invention may be solid at ordinary temperature. A dental glass composition of the present invention can be used as a porcelain stain of the direct application type, even when it is solid at ordinary temperature. In certain embodiments, a dental glass composition of the present invention can be used as a shade adjusting composition for ceramic crown porcelain.

A dental glass composition of the present invention can readily draw on a dental prosthesis base material having a ceramic surface to mimic the tooth characteristics (hereinafter, also referred to as "characters"). That is, a dental glass composition of the present invention can be used by itself like wood charcoal or oil pastels for rough sketching, or can readily draw fine characters such as enamel cracks or hairlines when the tip is sharpened in the same way as sharpening a pencil. A dental glass composition of the present invention can also be applied to various techniques. For example, shading (adding a gradation or blurring) is possible when a dental glass composition of the present invention is applied to a cheek color brush or a sponge tip eye color applicator, and rubbed to draw on a dental prosthesis base material having a ceramic surface. Here, the characters can be, for example, staining or discoloration of the cementum, dentin, cervical region, and adjacent surfaces of natural teeth, demineralization, enamel cracks, and hairlines trapping color components.

Traditional porcelain stains are fired and fixed after application. That is, firing and fixing is necessary in traditional porcelain stains to prevent bleeding or running of the porcelain stain after it is applied and before porcelain is built up on the surface layer. In order to mimic the dentin or other internal structure of natural teeth, a dental prosthesis needs to be vertically stained from the incisal edge to the cervical portion, whereas, when recreating portions such as the cementum, the porcelain stain needs to be mesiodistally layered sideways. Firing and fixing is therefore required to prevent mixing that occurs every time the staining direction is changed.

Unlike traditional porcelain stains, a dental glass composition of the present invention is solid, and has no flowability. Accordingly, the dental glass composition exhibits good fixability after drawing, and does not require firing and fixing after every layering. The firing and fixing process can be omitted because a dental glass composition of the present invention, by exhibiting good fixability to a final dental prosthesis even when dental porcelain is built up on the surface layer without firing and fixing the dental glass composition after application, does not bleed or run off, or form bubbles or turn black when the dental porcelain is subsequently fired after build-up. With a dental prosthesis production method of the present invention, it is therefore possible to obtain a dental prosthesis only by single firing after dental porcelain is built up following application of the dental glass composition to the base material. By simplifying the production process, the production efficiency can greatly improve.

In the case of internal staining, dental porcelain is built up and fired after the application of a dental glass composition of the present invention, and is shaped to recreate a crown shape to provide a fit to the natural teeth. The dental prosthesis is finished after subsequent glazing (self-glazing), a process that provides luster by melting only the dental porcelain's surface layer. A dental glass composition of the present invention can also be used for surface staining that imparts color simultaneously with glazing performed to provide luster with glaze glass of a low melting temperature after the final shaping. The dental porcelain used for a dental prosthesis production method of the present invention is not particularly limited, and known dental porcelains can be used. Examples of known dental porcelains include commercially available products, for example, such as Cerabien® ZR Press LF External Stain (manufactured by Kuraray Noritake Dental Inc.).

The firing temperature (highest temperature in firing) after a build-up of dental porcelain in the present invention can be appropriately varied according to factors such as the type of dental porcelain, and a form of use, and is not particularly limited as long as the inorganic pigments can produce color. However, the firing temperature is preferably 700° C. or more, more preferably 730° C. or more, even more preferably 750° C. or more. The upper limit of firing temperature is not particularly limited, and is preferably 1,100° C. or less, more preferably 1,050° C. or less, even more preferably 1,000° C. or less. The rate of temperature increase in firing to the highest temperature can be appropriately varied according to the type of porcelain, and is not particularly limited. However, the rate of temperature increase is preferably about 10 to 70° C./min, more preferably about 20 to 60° C./min.

Specific examples of the dental prosthesis include copings, frameworks, denture bases, dentures, orthodontic products, and implant products. Examples of the dentures include crowns, bridges, inlays, onlays, and laminate veneers. Examples of the orthodontic products include brackets. Examples of the dental implant products include implants, abutments, implant fixtures, implant bridges, and implant bars.

EXAMPLES

The following describes the present invention in greater detail by way of EXAMPLES. It is to be noted, however, that the present invention is not limited by the following EXAMPLES.

The solid dental glass compositions of Examples 1 to 9, and the glass compositions of Comparative Examples 1 and 2 were prepared in the manner described below, and the properties of these compositions were evaluated. The results are presented in Tables 1 to 4.

Examples 1 to 9

An oil component (C) was added to a wax component (B) that had been melted in a container on a 120° C. hot stirrer, followed by addition of a glass powder (A-1) (Cerabien® ZR Press LF External Stain; manufactured by Kuraray Noritake Dental Inc.), or a glass powder (A-2) (Cerabien® ZR Press LF Luster; manufactured by Kuraray Noritake Dental Inc.). These were added in the mass percentages shown in Tables 1 to 3, and were mixed to uniformity with a metal spatula. The mixture was then poured into a mold measuring 20.0 mm in length, 1.5 mm in width, and 1.5 mm in depth, and cooled to solidify into a solid dental glass composition.

Comparative Examples 1 and 2

The components shown in Table 4 were weighed on a glass plate to provide the mass percentages shown in the table, and were mixed as-weighed with a spatula to obtain a paste-like composition.
[Preparation of Zirconia Sintered Body]
A commercially available dental zirconia (KATANA® Zirconia STML; manufactured by Kuraray Noritake Dental Inc.) was worked into a cylindrical shape of about an 18 mm diameter, and was fired into a zirconia sintered body by being held at 1,550° C. for 2 hours using a Noritake KATANA® F-1 furnace manufactured by SK Medical Electronics Co., Ltd.
[Method of Fixability Evaluation]
The dental glass composition prepared above was used to draw a line on a surface of the zirconia sintered body prepared, and a mixture of porcelain (Cerabien® ZR Press LF Translucent; manufactured by Kuraray Noritake Dental Inc.) in purified water was built up on the dental glass composition. The dental glass composition was evaluated as being good when the line drawn retained its shape, and poor when the line failed to retain its shape as a result of running with the porcelain (n=3). The evaluation assessed the dental glass composition, considering it "Good" when the line drawn retained its shape in all of the specimens, and "Poor" when any of the specimens showed a line that failed to retain its shape by running with the porcelain.
[Method of Chromogenicity Evaluation]
The dental glass composition prepared above was used to draw a line on a surface of the zirconia sintered body prepared, and a mixture of porcelain (Cerabien® ZR Press LF; manufactured by Kuraray Noritake Dental Inc.) in purified water was built up on the dental glass composition. The dental glass composition was evaluated after being held at 840° C. for 1 minute, and was deemed good when the line drawn had a clear hue, moderate when the line had an unclear hue with a shade of white, and poor when the line did not show any hue (n=3). The evaluation assessed the dental glass composition, considering it "Good" when the line drawn had a clear hue in all of the specimens, "Moderate" when the line had an unclear hue with a shade of white in any of the specimens, and "Poor" when the line did not show any hue in any of the specimens.

TABLE 1

| Components (mass %) | | Average particle diameter | Properties at ordinary temperature | Melting point | Boiling point | Example 1 | Example 2 |
|---|---|---|---|---|---|---|---|
| Glass powder (A) | Glass powder (A-1) | 4.0 μm | Powder | — | — | 73.0 | |
| | Glass powder (A-2) | 35.0 μm | Powder | — | — | | 73.0 |
| Wax (B) | White petrolatum | | Plaster-like | 38-60° C. | 302° C. | 8.0 | 8.0 |
| | Paraffin wax | | Solid | 58-60° C. | 322° C. | | |
| | Stearic acid | | Solid | 69-70° C. | 361° C. | 8.0 | 8.0 |
| | Candelilla wax | | Solid | 68-72° C. | 240° C. | | |
| | Carnauba wax | | Solid | 81-86° C. | | 3.0 | 3.0 |
| | Behenic acid | | Solid | 79.9° C. | 306° C. | | |
| Oil (C) | Liquid paraffin | | Liquid | −17.8° C. | 360° C. | 8.0 | 8.0 |
| | Oleyl alcohol | | Liquid | 13-19° C. | 330° C. | | |

TABLE 1-continued

| Components (mass %) | | Average particle diameter | Properties at ordinary temperature | Melting point | Boiling point | Example 1 | Example 2 |
|---|---|---|---|---|---|---|---|
| Other | Triethanolamine | | Liquid | 21° C. | 335° C. | | |
| Properties of glass composition | | | | | | | |
| (a) Fixability | | | | | | Solid | Solid |
| (b) Chromogenicity | | | | | | Good | Good |
| | | | | | | Good | Good |

TABLE 2

| Components (mass %) | | Average particle diameter | Properties at ordinary temperature | Melting point | Boiling point | Example 3 | Example 4 | Example 5 |
|---|---|---|---|---|---|---|---|---|
| Glass powder (A) | Glass powder (A-1) | 4.0 μm | Powder | — | — | 80.0 | 70.0 | 68.0 |
| Wax (B) | White petrolatum | | Plaster-like | 38-60° C. | 302° C. | | | 14.0 |
| | Paraffin wax | | Solid | 58-60° C. | 322° C. | | 14.0 | |
| | Stearic acid | | Solid | 69-70° C. | 361° C. | 4.0 | 2.0 | 4.0 |
| | Candelilla wax | | Solid | 68-72° C. | 240° C. | | 4.0 | |
| | Carnauba wax | | Solid | 81-86° C. | | | 4.0 | 2.0 |
| | Behenic acid | | Solid | 79.9° C. | 306° C. | 5.7 | | 8.0 |
| Oil (C) | Liquid paraffin | | Liquid | −17.8° C. | 360° C. | | 6.0 | 4.0 |
| | Oleyl alcohol | | Liquid | 13-19° C. | 330° C. | 0.6 | | |
| Other | Triethanolamine | | Liquid | 21° C. | 335° C. | 9.7 | | |
| Properties of glass composition | | | | | | | | |
| (a) Fixability | | | | | | Solid | Solid | Solid |
| (b) Chromogenicity | | | | | | Good | Good | Good |
| | | | | | | Good | Good | Good |

TABLE 3

| Components (mass %) | | Average particle diameter | Properties at ordinary temperature | Melting point | Boiling point | Example 6 | Example 7 | Example 8 | Example 9 |
|---|---|---|---|---|---|---|---|---|---|
| Glass powder (A) | Glass powder (A-1) | 4.0 μm | Powder | — | — | 60.0 | 57.4 | 50.0 | 45.0 |
| Wax (B) | Paraffin wax | | Solid | 58-60° C. | 322° C. | | | | 53.0 |
| | Stearic acid | | Solid | 69-70° C. | 361° C. | 4.0 | 8.0 | 30.0 | 4.0 |
| | Polyethylene glycol | | Solid | 57.5° C. | 250° C. | 4.8 | | | |
| | Behenic acid | | Solid | 79.9° C. | 306° C. | 17.0 | 21.8 | | |
| Oil (C) | Liquid paraffin | | Liquid | −17.8° C. | 360° C. | | | | 2.0 |
| | Oleyl alcohol | | Liquid | 13-19° C. | 330° C. | 1.2 | 1.4 | 20.0 | |
| Other | Triethanolamine | | Liquid | 21° C. | 335° C. | 17.0 | 19.4 | | |
| Properties of glass composition | | | | | | | | | |
| (a) Fixability | | | | | | Solid | Solid | Solid | Solid |
| (b) Chromogenicity | | | | | | Moderate | Moderate | Moderate | Moderate |
| | | | | | | Moderate | Moderate | Moderate | Moderate |

TABLE 4

| Components (mass %) | Sole properties | Melting point | Boiling point | Comparative Example 1 | Comparative Example 2 |
|---|---|---|---|---|---|
| Water | Liquid | 0° C. | 100° C. | | 35.0 |
| Propylene glycol | Liquid | −59° C. | 189° C. | 35.0 | |
| Glass powder (A-1) | Powder | — | — | 65.0 | 65.0 |
| Properties of glass composition | | | | | |
| (a) Fixability | | | | Paste | Paste |
| (b) Chromogenicity | | | | Poor | Poor |
| | | | | Poor | Poor |

The paste-like compositions of Comparative Examples 1 and 2 did not fix or produce color, and the aesthetics were poor as a dental prosthesis. Speculatively, the observed poor aesthetics are probably due to the absence of firing and fixing required by the paste-like composition, causing the paste-like composition to shift in position from the original location of application by the effect of partial mixing with the porcelain built up after the application of the paste composition. The solid dental glass compositions of Examples 1 to 9 had desirable fixability and chromogenicity, despite the absence of firing and fixing. Because of the higher content of the liquid components, the dental glass compositions of Examples 6 to 8 were slightly softer, and the fixability and chromogenicity were moderate. In Example 9 in which the second wax (B-2) having a relatively low melting point was solely used as wax component (B), the dental glass composition had slightly softer solid properties, and the fixability and chromogenicity were moderate.

INDUSTRIAL APPLICABILITY

A glass composition of the present invention, by being solid and having good fixability to dental prostheses, undergoes hardly any changes over time in the glass composition itself, and can be applied to a dental prosthesis in thin films, without bleeding owing to having no flowability. A glass composition of the present invention is therefore easy to handle, and enables easy fabrication of a dental prosthesis of desired shade. This makes a glass composition of the present invention suited for use as a dental glass composition. A dental glass composition of the present invention, requiring no firing and fixing, is useful given an expected increase in the use of dental glass compositions, particularly in response to the continuously growing demand for ceramic crowns and the associated increase in individual demand for better aesthetics.

The invention claimed is:

1. A dental glass composition for staining and shade adjustment of dental prostheses, the dental glass composition comprising:
    a glass powder (A);
    a wax component (B); and
    an oil component (C),
    wherein a content of the oil component (C) in the dental glass composition is 0.3 to 30 mass %.
2. The dental glass composition according to claim 1, wherein the glass powder (A) has an average particle diameter of 0.05 μm to 50 μm.
3. The dental glass composition according to claim 1, wherein the wax component (B) has a boiling point of 400° C. or less.
4. The dental glass composition according to claim 1, wherein the wax component (B) has a melting point of 35 to 120° C.
5. The dental glass composition according to claim 4, wherein the wax component (B) comprises a high-melting-point wax (B-1) having a melting point of 75° C. or more and 120° C. or less.
6. The dental glass composition according to claim 1, wherein a content of the wax component (B) in the dental glass composition is 3 to 65 mass %.
7. The dental glass composition according to claim 1, wherein the oil component (C) has a boiling point of 100 to 400° C.
8. The dental glass composition according to claim 1, wherein a content of the wax component (B) in the dental glass composition is 5 to 65 mass %.
9. The dental glass composition according to claim 1, wherein the content of the oil component (C) in the dental glass composition is less than that of the wax component ((B).
10. The dental glass composition according to claim 1, which is a porcelain stain.
11. A method for producing a dental prosthesis, the method comprising
    applying the dental glass composition according to claim 1 to a dental prosthesis base material having a ceramic surface, and
    firing dental porcelain after build-up without firing the base material to which the dental glass composition has been applied.
12. The method according to claim 11, wherein the firing after a build-up of the dental porcelain has a firing temperature of 700 to 1,100° C.

* * * * *